United States Patent [19]

Haupin et al.

[11] 4,039,648
[45] Aug. 2, 1977

[54] PRODUCTION OF ALUMINUM CHLORIDE

[75] Inventors: Warren E. Haupin; John A. Remper, both of Lower Burrell; M. Benjamin Dell, Pittsburgh, all of Pa.

[73] Assignee: Aluminum Company of America, Pittsburgh, Pa.

[21] Appl. No.: 639,995

[22] Filed: Dec. 12, 1975

[51] Int. Cl.² .......................... C01F 7/58; C01F 7/60; C01F 7/56
[52] U.S. Cl. .................. 423/496; 423/136; 423/137; 423/495; 423/DIG. 12
[58] Field of Search .............. 423/495, 496, 136, 137, 423/659 A

[56] References Cited

U.S. PATENT DOCUMENTS

| 1,862,298 | 6/1932 | Carl | 423/136 |
| 3,760,066 | 9/1973 | Calcagno et al. | 423/496 |
| 3,786,135 | 1/1974 | King et al. | 423/496 |
| 3,811,916 | 5/1974 | Russell et al. | 423/496 X |

OTHER PUBLICATIONS

Article by Grosher et al., Tr. po Khim. i Khim. Technol. 3, 344–351 (1960).
Chem. Abstracts, vol. 55, No. 8, Apr. 17, 1961, p. 7769.

Primary Examiner—Edward Stern
Attorney, Agent, or Firm—Andrew Alexander

[57] ABSTRACT

A method for producing aluminum chloride comprises contacting $Al_2O_3$ with a reducing agent and chlorine in a bath of molten metal halides to form aluminum chloride and recovering the aluminum chloride by vaporization.

10 Claims, 1 Drawing Figure

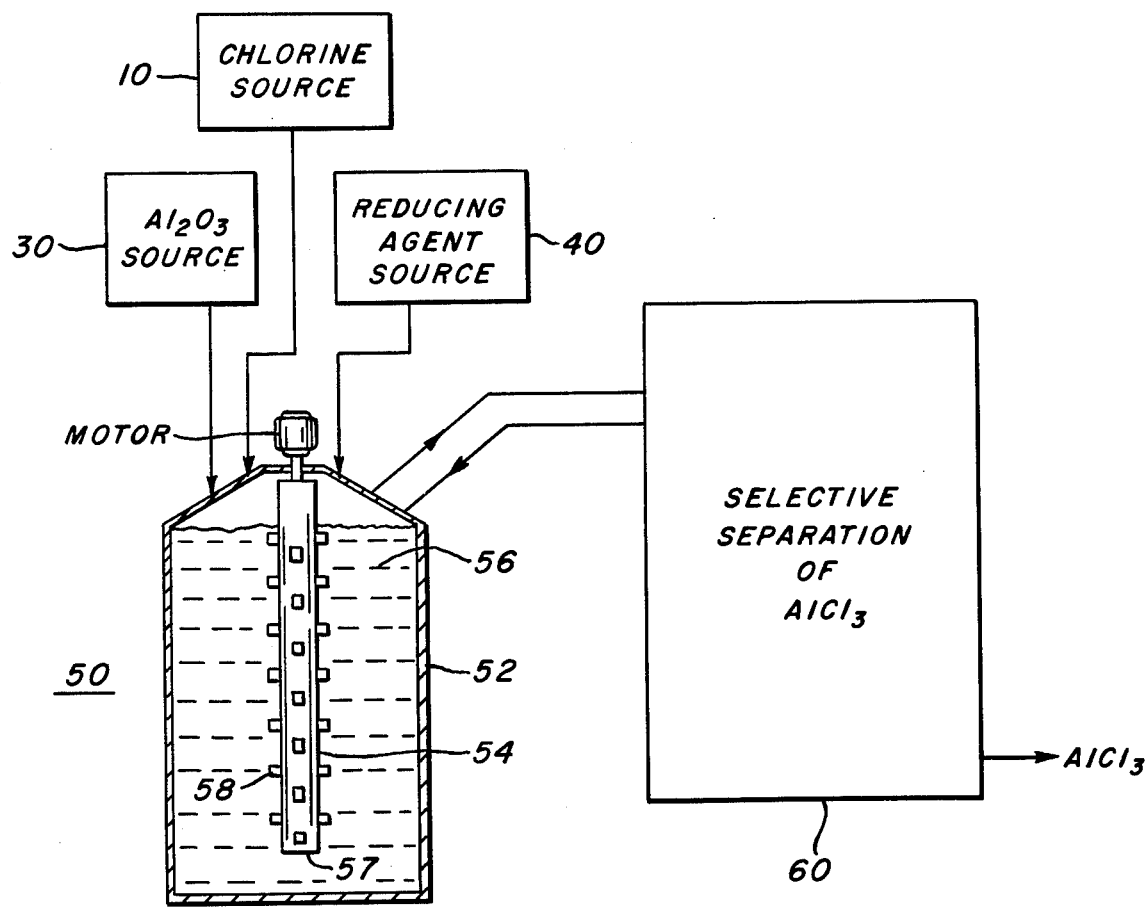

PRODUCTION OF ALUMINUM CHLORIDE

CROSS REFERENCE TO RELATED APPLICATIONS

This application contains subject matter relating to application Ser. No. 644,416, entitled "Production of Aluminum Chloride", filed Dec. 24, 1975 in the names of David A. Wholeber and C. Norman Cochran.

BACKGROUND OF THE INVENTION

This invention refers to aluminum chloride and more particularly to a method of forming aluminum chloride.

Because of the interest which has existed through the years in aluminum chloride as a catalyst and in the possibility of electrolytically producing aluminum from aluminum chloride, considerable effort has been expended to produce aluminum chloride in a highly economical manner. Production of such aluminum chloride by the reduction of alumina-containing materials with a source of chlorine and in the presence of a solid reducing agent such as carbon, or a gaseous reducing agent such as carbon monoxide is known in the art.

For example, Hille et al in *The Production of Anhydrous Chloride from $\gamma$-Alumina in a Fluidized Bed*, Angew. Chem. Internat. Edit. Vol. 72, 1960, pp. 73–79, teach the reaction of an alumina-containing material such as bauxite or clay with chlorine gas in the presence of a gaseous or solid reducing agent in a shaft furnace as well as the reaction of gamma alumina with chlorine gas in the presence of carbon monoxide in a fluidized bed.

It is well known that alumina will dissolve in cryolite or alkali halide. Thus, it was proposed by Hall in U.S. Pat. No. 1,405,115 that aluminum chloride be formed by passing chlorine and sulfur gases through such a mixture. However, such a method can result in channeling of the gaseous reactants with the result that either one of the gases may not contact both the alumina and the other gas in which instance the aluminum chloride yield may be quite low.

Russell et al. in U.S. Pat. No. 3,842,163 teach and claim the production of a high purity aluminum chloride useful in the electrolytic production of aluminum by feeding a substantially pure alumina coated or impregnated with carbon into a fluidized bed with chlorine gas to produce aluminum chloride. However, this process requires a preliminary step to coat or impregnate the alumina with carbon.

It has also been suggested in German Patentschrift No. 842,986 that the addition of alkali chlorides has a favorable effect on a process in which alumina is contacted with phosgene or chlorine and carbon monoxide.

Groshev et al. in *The Chlorination of Oxides of the Residue from a Shaft Furnace which Produces Anhydrous Aluminum Chlorides the Oxides being Suspended in a Medium of Molten Chlorides*, Tr. po Khim, i Khim. Technol. 3, 344–351 (1960), teach chlorinating the residue of a shaft furnace to produce aluminum chloride and iron-free silicon tetrachloride using coke oil and chlorine. A batch of the residue is suspended in a molten bath of KCl, NaCl and $AlCl_3$. However, according to this article, only 50% of the chlorine added is converted, i.e. presumably a 50% yield. Coke oil present in an amount over 5% is stated to have no effect on increasing the yield. The article also states that the absence or presence of $AlCl_3$ up to 69.5% has no effect on the chlorination. Size of particles of the solid phase does not affect chlorination either according to the article.

Such processes, however, while producing high purity aluminum chloride suitable for use as Friedel-Crafts catalyst or for electrolytic production of aluminum, often are not very efficient and may generate effluent dust which then must be removed before the $AlCl_3$ is condensed.

Quite surprisingly we have discovered a system for producing aluminum chloride in a molten salt bath which solves or eliminates most of these problems. For example, the process is highly economical in that chlorine conversion can be 100% eliminating waste of the chlorine or subsequent separation steps. Also, this yield can be achieved using low surface area alumina which is generally considered to be less reactive.

SUMMARY OF THE INVENTION

The main object of this invention is to provide an improved system for the production of aluminum chloride.

Another object of this invention is to provide an improved process for the production of aluminum chloride by reaction of sources of aluminum oxide, carbon and chlorine in a molten salt bath.

These and other objects will become apparent from the description and the drawing.

In accordance with these objectives, it has now been discovered that aluminum chloride can be produced by contacting a source of aluminum oxide and a solid reducing agent with a source of chlorine in a molten bath consisting of at least one salt selected from the group consisting essentially of alkali metal halides and alkaline earth metal halides. The bath also must contain at least 30% by weight aluminum chloride. In a preferred embodiment, the aluminum oxide and the reducing agent are present in stoichiometrically excessive amounts thus providing maximum yield from the chlorine. Maximum yield is achieved when the bath contains a relatively high concentration of aluminum chloride.

BRIEF DESCRIPTION OF THE DRAWING

In the description below reference is made to the sole FIGURE which is generally a schematic representation illustrating a system for producing aluminum chloride in accordance with the invention.

DETAILED DESCRIPTION OF THE PREFERRED EMBODIMENTS OF THE INVENTION

In accordance with the present invention, in the drawing there is provided a schematic of a system for producing aluminum chloride wherein aluminum oxide source 30, chlorine source 10 and reducing agent source 40 are introduced to a molten bath, generally referred to as 50, wherein these materials form aluminum chloride. The chlorine source, which for example may be $Cl_2$, in liquid or gaseous or other form, can be expeditiously introduced to bath 50 through hollow impeller means 54 which allows it to emanate through end 57 thereon. Impeller blades 58 serve to disperse the chlorine throughout the extent of the bath. The alumina and reducing agent can be metered to the bath by a conventional screw feeder (not shown). Aluminum chloride is vaporized from bath 50 and then recovered from other entrained materials by selective separation 60. Thereafter the aluminum chloride is condensed and removed.

A preferred source of chlorine suitable for use in the present invention is $Cl_2$. However, other chlorine bearing materials such as $COCl_2$ and $CCl_4$, or mixtures thereof can be used. Preferably the source of chlorine is in the gaseous form, but a liquid or solid is also to be considered as within the scope of the invention.

With respect to the reducing agent, in its broadest aspect, the present invention contemplates the use of any non-gaseous reducing agent. That is, the reducing agent should be in liquid or solid form. A suitable non-gaseous reducing agent can be selected from the group consisting of carbon, sulfur, antimony, phosphorus and arsenic. Sometimes it can be advantageous to use more than one of these reducing agents. The preferred reducing agent is solid carbon. The source of carbon can be coal, coke or petroleum as well as purified carbon obtained therefrom. The carbon preferably is ground or milled to about mesh size of −48 to −325 (Tyler series) although smaller particle size can be used.

Aluminum oxide which can be used for the formation of aluminum chloride in accordance with the present invention may be used in the unrefined form which includes, for example, clays, bauxite, anorthosite, red mud, feldspar, oil or coal shale, etc. Thus, it should be understood that the present invention can utilize most sources of aluminum oxide. However, it will be apparent to those skilled in the art that the use of other than refined aluminum oxide can require selective separation processes subsequent to the chlorination to remove impurities such as iron chloride, which would otherwise provide an impure aluminum chloride form. Accordingly, to minimize the separation problems encountered by use of the unrefined sources of aluminum oxide, it is preferred that most of the impurities be removed from the aluminum oxide source prior to the use of the oxide in the present invention. Thus, a highly preferred form of aluminum oxide for use in the present invention is alumina which is intended to mean an aluminum oxide product after the same has been extracted from its ores. The well known Bayer process is one source of such alumina in which process, bauxite ore is extracted with caustic soda to selectively dissolve the aluminum content as sodium aluminate while leaving behind impurities such as iron, silicon and titanium. In this process, alumina is recovered as Bayer hydrate, i.e., $Al(OH)_3$ which is subsequently calcined to remove most of the water for reasons which will be discussed below.

One of the significant benefits derived from the present invention is its capability to chlorinate most types of aluminum oxide which includes alpha, gamma, delta, theta, iota, eta, chi and kappa alumina. This benefit is particularly surprising from the fact that these different forms of alumina can have surface areas ranging from 0.5 m.$^2$/g. or less to 110 m.$^2$/g. or greater. In most prior art reactions involving aluminum oxide, this large variation in surface area can lead to relatively low reaction rates for the low surface area material and relatively high reaction rates for the high surface material. For example, in the above-mentioned Russell et al. patent, the high surface area alumina is preferred because of the difficulty in chlorinating the low surface area material. In the present invention, surprisingly, there is no particular difficulty encountered in chlorinating the various forms of alumina. For example, the present invention has the ability to chlorinate low surface area alumina, e.g. alpha alumina normally having a surface area of 0.5 to 1.0 m.$^2$/g. with an efficiency which is equivalent to that expected of the so-called gamma alumina having a surface area of 70 to 110 m.$^2$/g. Thus, the present invention can be highly effective in chlorinating not only the various types of aluminum oxide but combinations of the different types as well, therefore making the calcination conditions less critical than in the prior art.

It is preferred that the alumina used in the present invention have a low hydrogen and water content. Hydrogen or hydrogen bearing compounds react to form hydrogen chloride resulting in the loss of valuable chlorine. Thus, alumina suitable for use is preferably made from alumina hydrate calcined to substantially remove hydrogen or hydrogen bearing compounds such as water. Such calcining can be carried out in kilns or furnaces at a temperature of 600° to 1200° C or higher. Considerable low surface area alumina such as alpha alumina may be formed in the higher temperature range but, as mentioned above, such can be used advantageously in the present invention.

An important aspect of the present invention is the molten bath 50 which comprises aluminum chloride and one or more metal halides selected from the group consisting of alkali metal halides and alkaline earth metal halides. Bath 50 can also comprise an alkali-metal-alumino-halide compound such as, for example, cryolite and chiolite or mixtures of these. The combination must be capable of acting as a solvent for aluminum oxide. Of the halides, alkali metal chlorides and alkaline earth metal chlorides are preferred and in the alkali metals, lithium, sodium and potassium are preferred with sodium being most highly preferred. In the alkaline earth metals, calcium, barium and magnesium are preferred. While it has been indicated that the bath comprises $AlCl_3$ and metal halide, other ingredients may be present which do not substantially affect the reaction.

While we do not wish to be bound necessarily by any theory of operation, it is believed that the molten metal halide bath 50 dissolves the aluminum oxide thereby forming aluminum oxychloride. Thereafter, upon the addition of the reducing agent, carbon for example, molten metal halide and aluminum oxychloride contact the carbon particles intimately providing aluminum oxychloride on the carbon particle. When chlorine is added to the system, in order to form $AlCl_3$, it must only find or contact a particle of carbon coated with aluminum oxychloride in order to react. That is, two of the components, involved in the reaction, are thought to be fixed in postion awaiting to effect the reaction with the third component, chlorine. If these two components, carbon and aluminum oxide, are not fixed in position, then there has to be a three component collision — carbon, aluminum oxide and chlorine — in order to produce aluminum chloride. Thus, it would seem that the two components will come together with much greater frequency.

While the preferred halide is chloride, it should be understood that the addition of fluorides can be advantageous and therefore mixtures of chlorides and fluorides are deemed to be within the scope of the invention. For example, in certain instances it may be desirable to increase the solubility of aluminum oxide in the melt to improve the reaction rate. One way to make this improvement is to add fluorides to the melt. Thus, it can be seen that mixtures of halides can be highly beneficial.

As will be apparent from the discussion hereinbefore, for the bath to be operable it must be in a molten state. Thus, in its broadest aspect, for example, a molten metal halide is useful as a reaction bath from its melting point to its boiling point. For example, where the reaction bath comprises 30% sodium chloride and 70% aluminum chloride, the temperature can range from 150° to 1000° C. However, preferably, the operable temperature should be 400°–950° C with a temperature in the range of 600°–860° C being quite suitable.

Since the principal objective of the present invention is to improve the process for making $AlCl_3$, it is important to have a high rate of reaction or conversion efficiency of chlorine to $AlCl_3$. In the present invention using a combination of molten NaCl and $AlCl_3$ is as a means for effecting the reaction, it is preferred that the $AlCl_3$ constituent be allowed to concentrate in the molten bath to the saturation point at which time it then vaporizes from the molten bath. Thus, it is seen that upon saturation of the molten bath with $AlCl_3$, its vaporization rate will approximate its production rate in the bath. After vaporizing, the $AlCl_3$ is subsequently separated from other products coming off the bath and solidified. By allowing the $AlCl_3$ to concentrate, it has been discovered that the conversion efficiency of chlorine to $AlCl_3$ is increased significantly. For example, when the bath contained 1% $AlCl_3$, it was found that only 3% of the chlorine added was converted to $AlCl_3$. When the bath contained 30% $AlCl_3$, substantially 100% of the chlorine added was converted to $AlCl_3$. This high conversion efficiency continued to the point where the bath became saturated with $AlCl_3$.

Another important aspect of the present invention is the concentration of the reactants in the bath 50. It is important and preferred that carbon be present in excess. That is, it should be present initially in excess of the stoichiometric amount of the chlorinating material. The upper limit on the amount of carbon that can be added is normally reached when the addition of carbon causes the molten or chlorination bath to become noticeably viscous. Thus, preferably, the bath should contain carbon in the ratio of about 0.05 to 0.5 lbs. per lb. of bath. Additional amounts of carbon may be added stoichiometrically thereafter with other materials, e.g. chlorine, to maintain the excess.

As with carbon, preferably $Al_2O_3$ is present initially in excess of the stoichiometric amount of the chlorinating material. The upper limit of the excess is generally determined by the viscosity of the molten bath. That is, if too much $Al_2O_3$ is added then the molten bath can become too viscous, large $Cl_2$ gas bubbles form and chlorine conversion can become severely restricted. For purposes of this invention, preferably $Al_2O_3$ is initially present in the molten bath in a ratio of about 0.05 to 0.5 lbs. per lb. of bath and thereafter it should be added at least stoichiometrically with chlorine.

With an initial excess of carbon and $Al_2O_3$ and thereafter chlorine added stoichiometrically with carbon and $Al_2O_3$, the rate of reaction or efficiency of conversion of $Al_2O_3$ is to a large extent then controlled by the amount of chlorine being added to the bath. For example, if chlorine is added to the bottom of the molten bath in gaseous form, and if the flow rate is relatively high, the chlorine gas tends to channel through the molten bath resulting in a very low conversion efficiency of chlorine to $AlCl_3$. The amount of chlorine that can be added while still maintaining substantially 100% conversion can be increased if the chlorine is dispersed throughout the bath. Thus, it has been found desirable to provide a stirrer, or baffles or Raschig rings to direct chlorine to all parts of the molten bath.

Although not forming a part of the subject invention, the gaseous or vaporous aluminum chloride subliming from the hereindescribed chlorination process can be suitably recovered from the hot gaseous reaction effluent emanating from the chlorination bath 50 by suitable selective separation means 60 such as, for example, described in the Russell et al. U.S. patent referred to above. Several selective condensation steps may be included in the recovery process depending on the nature and extent of the impurities in the starting materials. For example, if the reducing agent were sulfur, or included sulfur, e.g. coal, a separating stage should be used to remove $SO_2$.

In operation of the present invention, aluminum chloride and a metal halide such as NaCl is added to container 52 and heat is applied to bring it to a molten state. Carbon and $Al_2O_3$ which preferably have been milled to mesh size of about $-48$ to $-325$ (Tyler series) or smaller are added to provide an excess as mentioned hereinabove. Thereafter, carbon, $Al_2O_3$ and chlorine should be added stoichiometrically and more or less continuously. To provide mixing of these components and also to ensure against channeling of the chlorine gas back up to the top of container 52, impeller means 54 is rotated by any suitable means such as an electric or air motor. In particular, the rotation of the impeller means 54, breaks up and disperses bubbles of chlorine throughout the bath thereby ensuring a high conversion efficiency of chlorine to aluminum chloride. The aluminum chloride thus formed is allowed to saturate the materials in container 52 after which it vaporizes therefrom and can be recovered in selective condensation separations.

Thus, it will be seen that the subject invention is highly advantageous in providing a highly economical method for the production of aluminum chloride. Other advantages include the fact that most of the carbon is converted to carbon dioxide instead of carbon monoxide thereby reducing the amount of carbon consumed. A further advantage includes the fact that the reaction in the present invention is exothermic and thus does not require the use of external heaters in order to sustain the reaction. Additionally, the very high chlorination efficiency, as noted above, allows the use of most forms of alumina and thus the more expensive forms of alumina such as the high surface area gamma alumina do not have to be used.

The reactor container 52 should be constructed of materials which will withstand degradation by molten metal halide materials or other materials constituting the reacting bath. Also, the materials of construction should be such as to prevent contamination of the effluent and to provide a suitable barrier to air and moisture. Examples of materials used include quartz and graphite and the like.

The following examples will serve to further illustrate the invention.

EXAMPLE 1

A chlorination bath comprising, by weight, about 50% NaCl, 25% LiCl and 25% $AlCl_3$ was brought to a temperature of about 800° C using resistance heaters. Carbon and alumina which were ground to a mesh size of $-325$ (Tyler series) were added to the above composition to provide about 0.06 lbs. carbon and 0.06 lbs. alumina per lb. of bath. Thereafter chlorine was diffused into the bath near the bottom thereof at about a rate of 0.31 lbs./hr. and carbon and alumina were added at about 0.0263 lbs./hr. and 0.149 lbs./hr., respectively, to maintain an excess thereof with respect to the chlorine. The bath was packed with Raschig rings to disperse the chlorine. Aluminum chloride concentration reached about 42% of the bath composition. Thereafter, it volatilized from the bath and was recovered from the effluent emanating therewith by selective separation. The purified aluminum chloride vapor was finally recovered by condensing. The yield of AlCl$_3$ with respect to the chlorine was 99.9%.

EXAMPLE 2

A chlorination bath was formed by combining about 169 lbs. of NaCl and 395 lbs. of AlCl$_3$, melting the combination and bringing it to a temperature of about 825° C. An excess of about 0.3 lbs. carbon and about 0.3 lbs. alumina per lb. of bath material was added. Thereafter, chlorine, in gaseous form, was added at about 245.1 lbs./hr., carbon at about 20.8 lbs./hr. and alumina at about 116.3 lbs./hr.

Aluminum chloride was recovered at a rate of about 304.1 lbs./hr. and NaCl and AlCl$_3$ combination was recycled to the chlorination bath at about 805.3 lbs./hr.

The chlorination bath was provided in a container measuring about 18 inches in diameter and about 58 inches deep. The impeller through which the chlorine was added extended near the bottom of the container and rotated at about 300 rpm. The alumina used was about 90% alpha and 10% gamma. Both the alumina and carbon were ground to a mesh size of about −100 (Tyler series).

Of the chlorine added, approximately 99% was converted to aluminum chloride and of the carbon added approximately 99% was converted to carbon dioxide.

While the invention has been described in terms of preferred embodiments, the claims appended hereto are intended to encompass all embodiments which fall within the spirit of the invention.

What is claimed is:

1. A method of producing AlCl$_3$ comprising:
   a. contacting alumina which has been extracted from its ore and which has a surface area in the range of 0.5 to 110 m$^2$/g and a carbonaceous reducing agent with a source of Cl$_2$ in a molten bath containing at least 30% by weight AlCl$_3$ with the balance consisting essentially of at least one metal halide, said bath being at a temperature in the range of 150° to 1000° C, said method being capable of exothermically converting substantially 100% of said Cl$_2$ to AlCl$_3$;
   b. maintaining said carbonaceous reducing agent in said bath in an amount in the range of 0.05 to 0.5 lbs/lb of molten bath, further maintaining said alumina in said bath in an amount in the range of 0.05 to 0.5 lbs/lb of molten bath;
   c. adding the alumina, reducing agent and Cl$_2$ to said bath in stoichiometric amounts for purposes of said contacting thereby maintaining the reducing agent and the alumina in said ranges; and
   d. recovering AlCl$_3$ by vaporization from the bath.

2. The method of claim 1 wherein the reducing agent and the source of chlorine comprise a single compound.

3. The method of claim 2 wherein the single compound is selected from the group consisting of COCl$_2$ and CCl$_4$.

4. The method of claim 1 wherein the reducing agent and the source of chlorine are separate compounds.

5. The method of claim 1 wherein the reducing agent is carbon.

6. The method of claim 1 wherein the source of Cl$_2$ is gaseous chlorine.

7. The method of claim 1 wherein the metal halide is selected from the group consisting of alkali and alkaline earth metal chloride.

8. The method of claim 1 wherein the molten bath temperature is in a range of 400° to 950° C.

9. The method of claim 1 wherein the reducing agent and the alumina each have a mesh size of less than 64 mesh (Tyler series).

10. A method of producing AlCl$_3$ comprising:
    a. contacting alumina, which has been extracted from its ore and calcined at a temperature of at least 600° C, and solid carbon, both ground to a mesh size of less than 64 (Tyler series), with gaseous chlorine in a molten bath, the alumina having a surface area in the range of 0.5 to 110 m$^2$/g, the molten bath containing 30% − 70% by weight AlCl$_3$ with the balance consisting essentially of NaCl at a temperature of 400° to 950° C, said bath capable of exothermically converting substantially 100% of said Cl$_2$ to AlCl$_3$;
    b. maintaining said carbon in said bath in an amount in the range of 0.05 to 0.5 lbs/lb of molten bath, and further maintaining said alumina in said bath in an amount in the range of 0.05 to 0.5 lbs/lb of molten bath;
    c. adding the alumina, carbon and Cl$_2$ to the bath in stoichiometric amounts for purposes of said contacting thereby maintaining the alumina and carbon in said ranges; and
    d. recovering AlCl$_3$ by vaporization from the bath.

* * * * *

UNITED STATES PATENT AND TRADEMARK OFFICE
CERTIFICATE OF CORRECTION

PATENT NO. : 4,039,648
DATED : August 2, 1977
INVENTOR(S) : Warren E. Haupin et al It is certified that error appears in the above-identified patent and that said Letters Patent are hereby corrected as shown below:

Col. 1, line 9                      Change "Wholeber" to --Wohleber--.

Col. 5, line 7                      After "$AlCl_3$" delete "is".

Signed and Sealed this

First Day of November 1977

[SEAL]

Attest:

RUTH C. MASON
*Attesting Officer*

LUTRELLE F. PARKER
*Acting Commissioner of Patents and Trademarks*